United States Patent
Kim et al.

(10) Patent No.: US 9,818,033 B2
(45) Date of Patent: Nov. 14, 2017

(54) MONITORING METHOD AND APPARATUS USING A CAMERA

(71) Applicant: HYUNDAI AUTRON CO., LTD., Seongnam-si (KR)

(72) Inventors: Myoung-Kwan Kim, Seoul (KR); Seok-In Kim, Seoul (KR)

(73) Assignee: HYUNDAI AUTRON CO., LTD., Seongnam-si (KR)

(*) Notice: Subject to any disclaimer, the term of this patent is extended or adjusted under 35 U.S.C. 154(b) by 19 days.

(21) Appl. No.: 14/961,149

(22) Filed: Dec. 7, 2015

(65) Prior Publication Data

US 2016/0171317 A1  Jun. 16, 2016

(30) Foreign Application Priority Data

Dec. 10, 2014 (KR) ........................ 10-2014-0177857

(51) Int. Cl.
*G06K 9/00* (2006.01)
*G06K 9/32* (2006.01)
(Continued)

(52) U.S. Cl.
CPC ..... *G06K 9/00805* (2013.01); *G06K 9/00369* (2013.01); *G06K 9/3241* (2013.01);
(Continued)

(58) Field of Classification Search
USPC .............. 382/100, 103–104, 106–107, 123, 382/154–155, 162, 168, 173, 181, 189,
(Continued)

(56) References Cited

U.S. PATENT DOCUMENTS

2010/0220189 A1* 9/2010 Yanagi ............... B60R 1/00 348/148
2011/0175752 A1* 7/2011 Augst ............... B60R 1/00 340/905
(Continued)

FOREIGN PATENT DOCUMENTS

DE 600 31 011 T2 4/2007
DE 11 2010 005 661 B4 10/2014
(Continued)

OTHER PUBLICATIONS

Korean Intellectual Property Office, Notice of Allowance for Korean patent application No. 10-2014-0177857, May 13, 2016, Korea.
(Continued)

*Primary Examiner* — Seyed Azarian
(74) *Attorney, Agent, or Firm* — BaKer McKenzie LLP; Hyunho Park

(57) ABSTRACT

The present invention relates to a monitoring method and a monitoring apparatus using a camera. According to an embodiment of the present invention, a monitoring method using a camera includes receiving a photographed input image from the camera; detecting an object existing in the input image and positional information of the object; generating a corrected image by correcting a distorted area of the input image; and generating a synthesized image by synthesizing alarm display information which is generated on the basis of the object and the positional information, with the corrected image, and outputting the synthesized image through a display.

10 Claims, 6 Drawing Sheets

(51) Int. Cl.
*G06T 5/00* (2006.01)
*H04N 7/18* (2006.01)

(52) U.S. Cl.
CPC .... *G06T 5/006* (2013.01); *G06T 2207/10132* (2013.01); *G06T 2207/30261* (2013.01)

(58) Field of Classification Search
USPC ....... 382/192, 199, 209, 219, 232, 254–256, 382/274, 276, 287–291, 305, 312; 348/46, 148; 340/905
See application file for complete search history.

(56) References Cited

U.S. PATENT DOCUMENTS

| | | | |
|---|---|---|---|
| 2012/0249794 A1 | 10/2012 | Kiyo et al. | |
| 2014/0063197 A1* | 3/2014 | Yamamoto | G08G 1/166 348/46 |
| 2014/0347483 A1* | 11/2014 | Nakanishi | B60R 11/04 348/148 |
| 2015/0042799 A1* | 2/2015 | Zhang | H04N 7/18 348/148 |

FOREIGN PATENT DOCUMENTS

| | | |
|---|---|---|
| JP | 2009-126493 A | 6/2009 |
| JP | 5052707 B2 | 10/2012 |
| KR | 10-2014-0048539 A | 4/2014 |
| WO | 2011158285 A1 | 12/2011 |

OTHER PUBLICATIONS

German Patent Office, Office Action for patent application 10 2015 120 014.7, Oct. 13, 2016, Germany.

\* cited by examiner

MONITORING METHOD AND APPARATUS USING A CAMERA

CROSS-REFERENCE TO RELATED APPLICATION

This application claims priority to and the benefit of Korean Patent Application No. 10-2014-0177857 filed in the Korean Intellectual Property Office on Dec. 10, 2014, the entire contents of which are incorporated herein by reference.

BACKGROUND

1. Technical Field

The present invention relates to a monitoring method and a monitoring apparatus using a camera.

2. Related Art

Recently, in order to improve convenience of a driver, various electronic application technologies have been incorporated into a vehicle. An around view monitoring system (AVM), which makes a driver recognize conveniently, correctly, and visually surroundings of the vehicle by photographing surrounding of the vehicle for displaying, among the electronic application technologies, has been widely used. The around view monitoring system (AVM) can photograph surroundings using cameras respectively provided at the front and the rear, and on the right side and the left side of the vehicle, and can display the photographed surroundings on a screen.

Particularly, the driver can correctly recognize a backward obstacle and a parking area through surroundings of the vehicle which is photographed by a rear camera that guides rear parking, and can park conveniently and easily the vehicle without viewing a side mirror or a back mirror.

However, since a conventional rear camera system photographs an image using a wide-angel camera having a wide angle of view, and corrects distorted image which is generated according to this, an obstacle is not viewed because the obstacle is small, or a blind spot appears. That is, the conventional rear camera system has a problem in which correct image information cannot be provided to a driver. Accordingly, a driver which tries to park a vehicle does not view a surrounding obstacle, and thus there exists risk of an accident that can collide with the obstacle. In addition, even though the drive is good at driving, the drive can ensure only visibility. Thus, it is difficult to park, and casualties occur due to lots of traffic accidents because the driver does not recognize a vehicle approaching from the rear.

SUMMARY

The present invention provides a monitoring method and a monitoring apparatus using cameras which can reduce risk of an accident due to a blind spot at the time of movement of a vehicle, by detecting a pedestrian or an obstacle of an input image before distortion correction, as an object, and by synthesizing alarm display information corresponding to the object with a corrected image generated through the distortion correction, for displaying.

Objectives of the present invention are not limited to the objective described above, and other objectives and advantages of the present invention which are not described above will be understood by the following description and be understood more apparently by embodiments of the present invention. In addition, it will be understood that the objectives and advantages of the present invention can be realized by means described in the claims and combination thereof.

According to one embodiment of the present invention, a monitoring method using a camera includes receiving a photographed input image from the camera; detecting an object existing in the input image and positional information of the object; generating a corrected image by correcting a distorted area of the input image; and generating a synthesized image by synthesizing alarm display information which is generated on the basis of the object and the positional information, with the corrected image, and outputting the synthesized image through a display.

In addition, according to another embodiment of the present invention, a monitoring apparatus using a camera includes an input unit which receives a photographed input image from the camera; an object detection unit which detects an object existing in the input image and positional information of the object; a distorted image correction unit which generates a corrected image by correcting a distorted area of the input image; and a synthesized image output unit which generates a synthesized image by synthesizing alarm display information which is generated on the basis of the object and the positional information, with the corrected image, and outputting the synthesized image through a display.

DETAILED DESCRIPTION OF THE EMBODIMENTS

Figure 1:
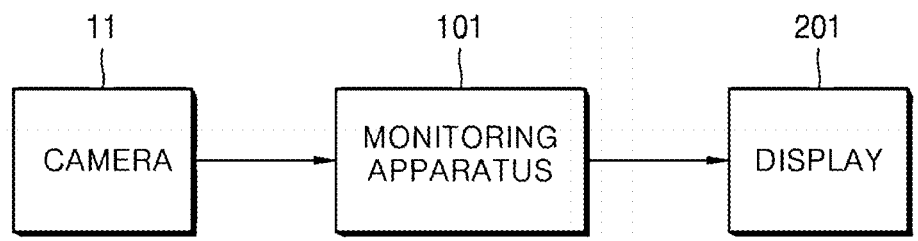
FIG. 1 is a configuration diagram of a monitoring apparatus of the related art.

The aforementioned objectives, features, and advantages will be described in detail with reference to the accompanying drawings, and according to this, those having ordinary knowledge in the art to which the present invention belongs will easily realize the technical spirit of the present invention. In the description of the present invention, if it is determined that the detailed description on the known technology related to the present invention makes the spirit of the present invention unclear, description thereof will be omitted. Hereinafter, the preferred embodiments will be described in detail with reference to the accompanying drawings. In the drawings, the same symbols or reference numerals will be used to indicate the same or similar configuration elements.

Figure 2:
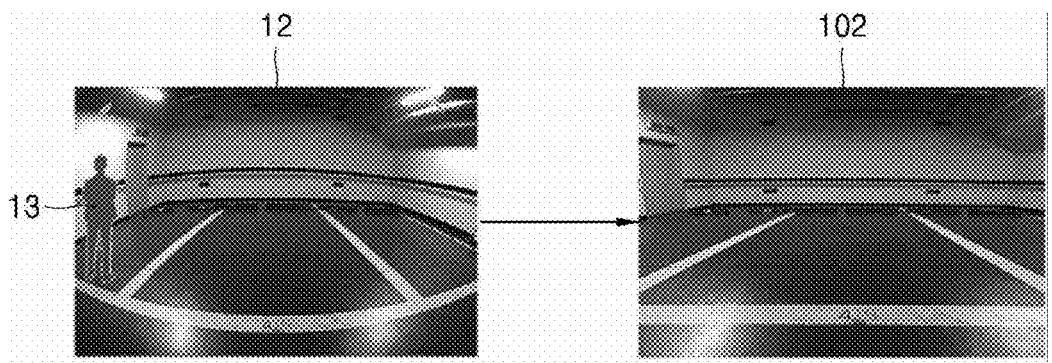
FIG. 2 is an example of an input image and a corrected image of the monitoring apparatus illustrated in FIG. 1.

FIG. 1 is a configuration diagram of a monitoring apparatus of the related art. FIG. 2 is an example of an input image and a corrected image of the monitoring apparatus illustrated in FIG. 1.

Referring to FIG. 1 and FIG. 2, a monitoring apparatus 101 of the related art receives a photographed input image 12 through a camera 11, and can correct a distortion area of the input image 12. At this time, a pedestrian or an obstacle 13 can be located at the distortion area of the input image 12. However, in order to provide a driver with a rear image which is not distorted, the monitoring apparatus 101 corrects the distortion area which includes the pedestrian or the obstacle 13. The pedestrian or the obstacle 13 which is included in the distortion area during the correction process, is removed. Accordingly, according to the related art, even though the pedestrian or the obstacle 13 actually exists on a rear side of a vehicle, an image 102 in which the pedestrian or the obstacle 13 does not exists is simply displayed on a screen, and thus there is a very high risk of an accident.

Figure 3:
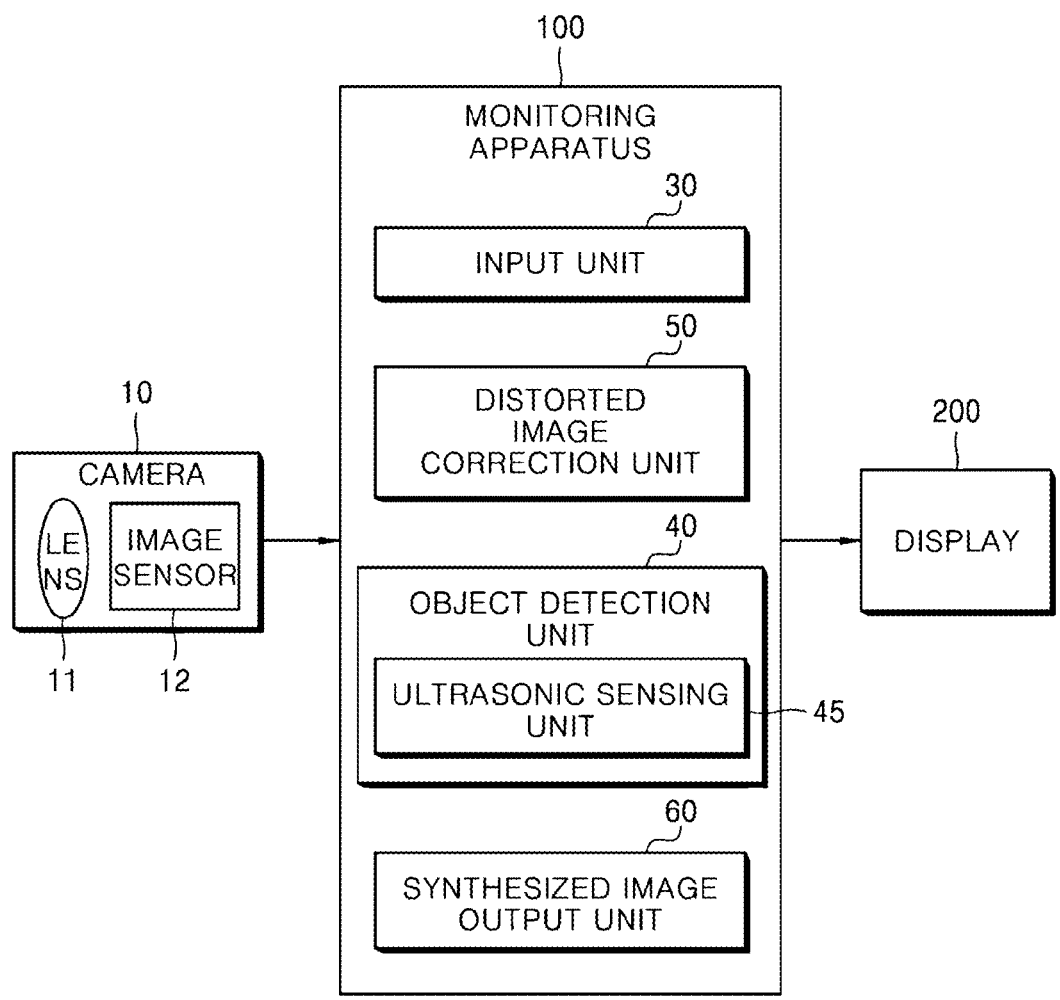
FIG. 3 is a configuration diagram of a monitoring apparatus according to a first embodiment.
Figure 4:
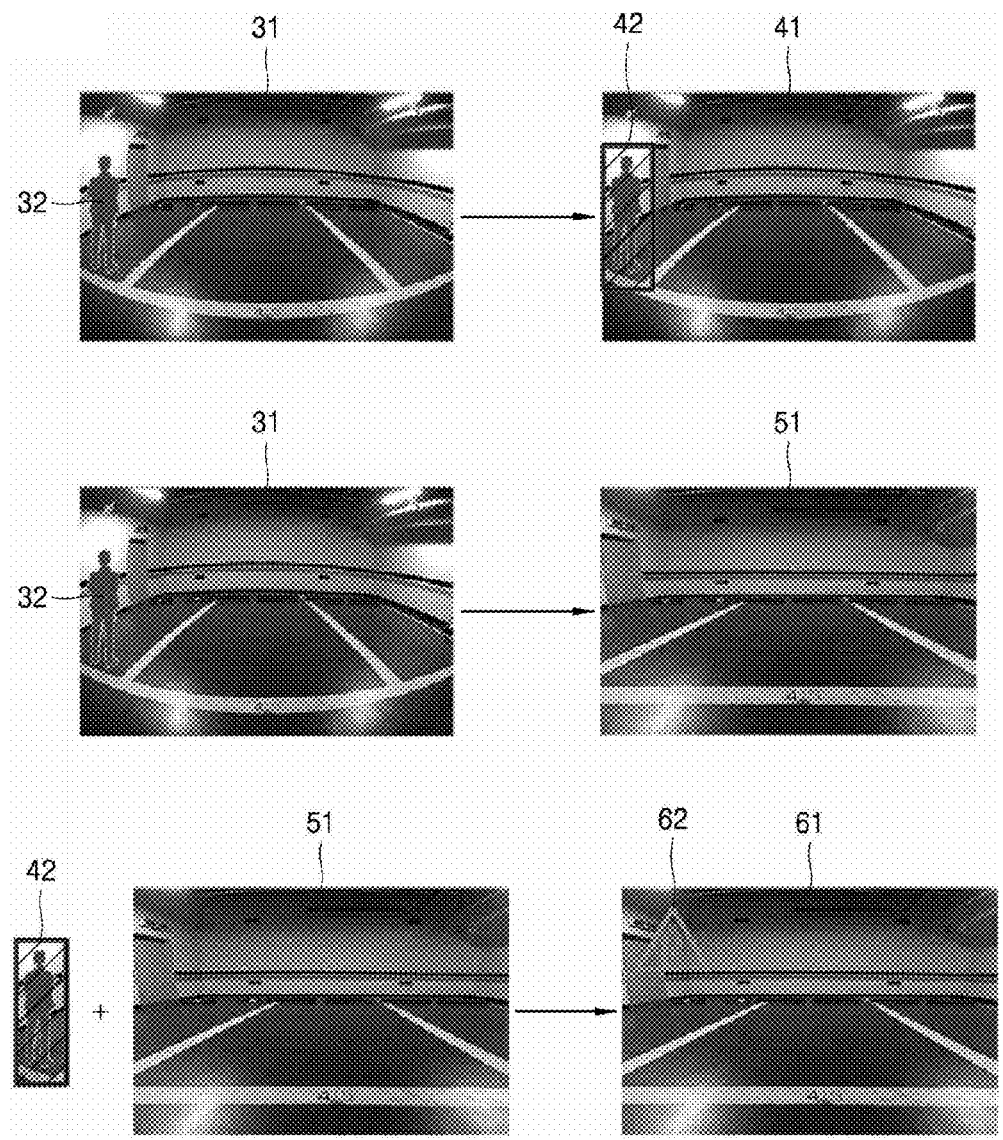
FIG. 4 illustrates an example in which the monitoring apparatus according to the first embodiment creates an object, a corrected image, and a synthesized image.

FIG. 3 is a configuration diagram of a monitoring apparatus according to a first embodiment, and FIG. 4 illustrates an example in which the monitoring apparatus according to the first embodiment creates an object, a corrected image, and a synthesized image.

Referring to FIG. 3 to FIG. 4, a monitoring apparatus 100 includes an input unit 30, an object detection unit 40, a distorted image correction unit 50, and a synthesized image output unit 60.

In more detail, the input unit 30 can receive a photographed input image 31 from a camera 10. Here, the camera 10 includes a lens 11 which can photograph the periphery of a vehicle, and an image sensor 12 which generates the input image 31 using a photographed image through the lens 11. According to the first embodiment, the camera 10 may be a front camera, a rear camera, or a side camera.

In addition, the object detection unit 40 can detect a pedestrian or an obstacle 32 which exists in the input image 31 received from the input unit 30, as an object 42, and can acquire positional information of the detected object 42. Here, the positional information of the object 42 may be a position corresponding to the pedestrian or the obstacle 32 when using the center of the input image 31 as a reference. For example, the positional information of the object 42 illustrated in FIG. 4 is specified on the left of the center of the input image 31. In more detail, the object detection unit 40 can measure a distance between the object 42 and a vehicle using an ultrasonic sensing unit 45, and can detect the measured distance information. Here, the ultrasonic sensing unit 45 can transmit an ultrasonic signal to the detected object 42, and can detect information on a distance between the object 42 and a vehicle, based on time of the ultrasonic signal which is reflected by the object 42 and then returns.

Figure 5:
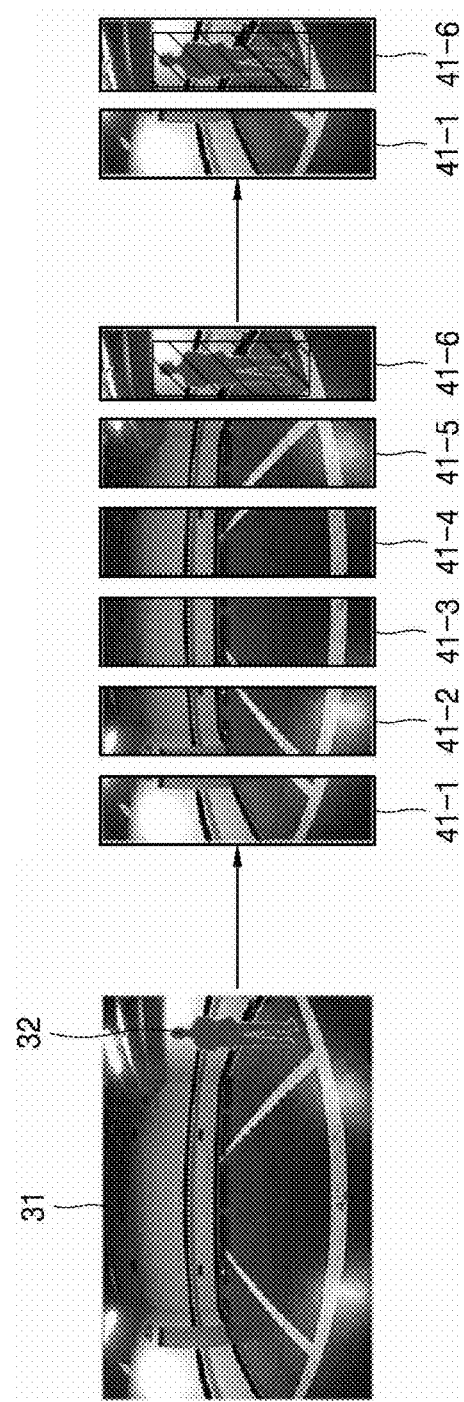
FIG. 5 is an example of an operation of an object detection unit according to the first embodiment.

FIG. 5 is an example of an operation of the object detection unit according to the first embodiment.

Referring to FIG. 5, the object detection unit 40 can divide the input image 31 into multiple areas 41-1 to 41-6 which are set in advance, and can search for the pedestrian or the obstacle 32 in peripheral areas 41-1 and 41-6 except for central areas 41-2 to 41-5, among the divided multiple areas 41-1 to 41-6. At this time, if the pedestrian or the obstacle 32 is searched for in the peripheral areas 41-1 and 41-6, the object detection unit 40 can detect the pedestrian or the obstacle 32 as the object 42.

Referring to FIG. 3 and FIG. 4 again, the distorted image correction unit 50 can generate a corrected image 51 by correcting a distorted area of the input image 31 which is received from the input unit 30. Here, the corrected image 51 can mean an image which is obtained by correcting distortion of a screen. That is, the distorted image correction unit 50 can generate the corrected image 51 in which the object 42 is removed, by correcting a distorted area of the input image 31 which is received from the input unit 30.

According to the first embodiment, the distorted image correction unit 50 can generate the corrected image 51 by correcting the distorted area of the input image 31 through a look-up table (LUT) including a distortion correcting algorithm, an affine transformation algorithm, and a time conversion algorithm which are stored in advance to correct the distorted area of the input image 31. At this time, the look-up table can mean a data table which is referenced in accordance with the distorted area of the input image 31, or data which is set in advance.

After that, the synthesized image output unit 60 can generate alarm display information 62 based on the object 42 detected by the object detection unit 40 and the positional information of the object 42, and can output a synthesized image 61 by synthesizing the corrected image 51 which is corrected by the distorted image correction unit 50 with the alarm display information 62. Here, the alarm display information 62 includes at least one of an alarm image and an alarm text.

According to another embodiment, the synthesized image output unit 60 can synthesize information on a distance between the object 42 detected by the object detection unit 40 and a vehicle with the alarm display information 62. At this time, the alarm display information 62 includes an alarm image or an alarm text, and a distance between the object 42 and a vehicle.

At this time, the synthesized image output unit 60 can determine a position of the alarm display information 62 to be displayed in the corrected image 51 in accordance with the positional information of the object 42 detected by the object detection unit 40.

Hereinafter, a position in which the alarm display information 62 will be displayed will be described with reference to FIG. 6.

Figure 6:
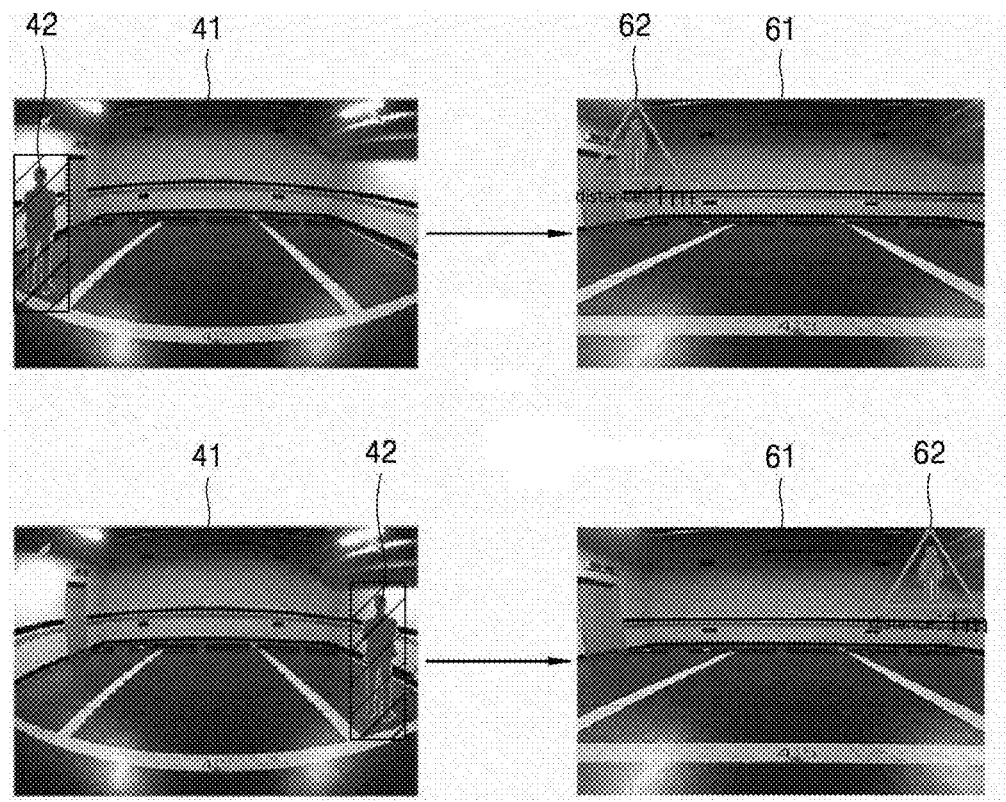
FIG. 6 is an example illustrating a method of determining a position of alarm display information to be displayed in the corrected image.

FIG. 6 is an example illustrating a method of determining a position of the alarm display information to be displayed in the corrected image.

Referring to FIG. 6, if the positional information of the object 42 detected by the object detection unit 40 is the left, the synthesized image output unit 60 can determine a position of the alarm display information 62 as an upper left area of the synthesized image 61. In addition, if the positional information of the object 42 detected by the object detection unit 40 is the right, the synthesized image output unit 60 can determine the position of the alarm display information 62 as an upper right area of the synthesized image 61.

In addition, the synthesized image output unit 60 can adjust the position of the alarm display information 62 to be displayed in the synthesized image 61 in accordance with the positional information of the object 42 detected by the object detection unit 40. That is, if the positional information of the object 42 detected by the object detection unit 40 is the right, the synthesized image output unit 60 can determine the position of the alarm display information 62 as a lower right area of the synthesized image 61, and if the positional information of the object 42 detected by the object detection unit 40 is the left, the synthesized image output unit 60 can determine a position of the alarm display information 62 as a lower left area of the synthesized image 61.

According to this, the synthesized image output unit 60 can generate the synthesized image 61 by synthesizing the alarm display information 62 with an area to be displayed in the corrected image 51, and can output the synthesized image 61 through a display 200. That is, even though the pedestrian or the obstacle 32 is removed from the distorted image correction unit 50 due to distortion correction, the synthesized image output unit 60 can provide the alarm display information 62 corresponding to the pedestrian or the obstacle 32 which is photographed by the camera 10 to a user through the display 200. Hereinafter, a monitoring method according to the present embodiment will be described with reference to FIG. 6.

Figure 7:
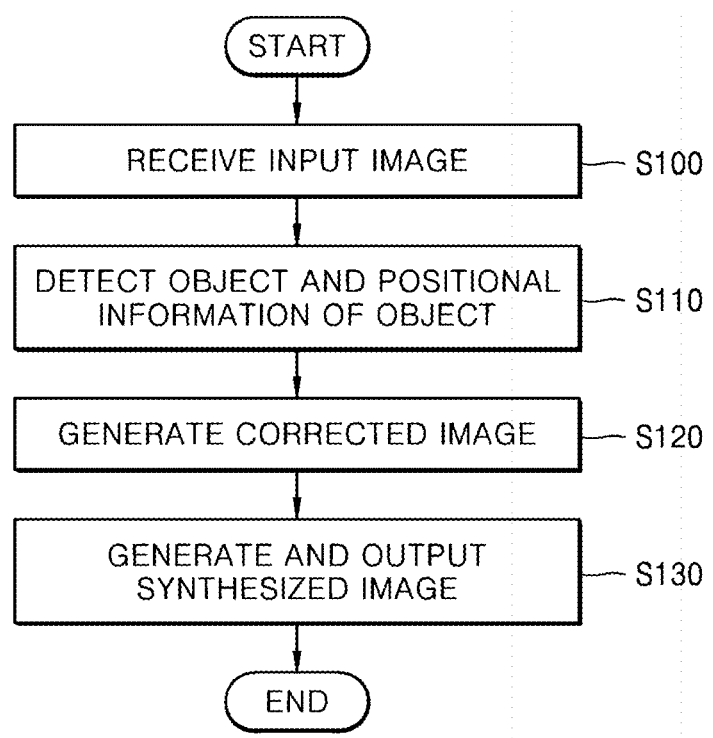
FIG. 7 is a flowchart illustrating an operation of the monitoring apparatus according to a second embodiment.

FIG. 7 is a flowchart illustrating an operation of the monitoring apparatus.

Referring to FIG. 7, the input unit 30 receives the photographed input image 31 from the camera 10 (S100). In addition, the object detection unit 40 detects the object 42 existing in the input image 31, and positional information of the object 42 (S110). At this time, the distorted image correction unit 50 generates the corrected image 51 by correcting the distorted area of the input image 31 (S120). After that, the synthesized image output unit 60 generates the corrected image 51 by synthesizing the alarm display information generated on the basis of the object 42 and the positional information of the object 42, with the corrected image 51, and outputs the synthesized image 61 through the display 200 (S130).

According to the present embodiment, the monitoring apparatus 100 can detect the pedestrian or the obstacle 32 in the input image 31 before the distortion correction, as the object 42, and can output by synthesizing the corrected image 51 generated through the distortion correction with the alarm display information 62 corresponding to the object 42. Accordingly, the monitoring apparatus 100 can obtain an effect in which risk of an accident at the time of movement of a vehicle can be reduced.

According to the present invention described above, risk of an accident at the time of movement of a vehicle can be reduced by detecting a pedestrian or an obstacle of an input image before distortion correction, as an object, and by synthesizing alarm display information corresponding to the object with a corrected image generated through the distortion correction, for displaying.

The present invention described above is intended to cover various replacements, modifications, and changes within a range not departing from the technical spirit of the present invention for those having ordinary knowledge in the art to which the present invention belongs, and is not limited to the aforementioned embodiments and the accompanying drawings.

What is claimed is:

1. A monitoring method using a camera, comprising:
   receiving a photographed input image from the camera;
   detecting an object existing in the input image and positional information of the object using the center of the input image as reference;
   generating a corrected image from which information on the object existing in a distorted area is removed by correcting the distorted area of the input image; and
   generating a synthesized image by synthesizing alarm display information including information on the object existing in the distorted area which is generated on the basis of the object and the positional information, with the corrected image, and outputting the synthesized image through a display.

2. The monitoring method according to claim 1, wherein the alarm display information includes at least one of an alarm image and an alarm text.

3. The monitoring method according to claim 1, wherein the alarm display information is displayed an area, which corresponds to the positional information, in the corrected image.

4. The monitoring method according to claim 1, wherein the detecting the positional information of the object includes: dividing the input image into multiple areas which are set in advance; and searching for a pedestrian or an obstacle by detecting a peripheral area other than a central area, among the divided multiple areas.

5. The monitoring method according to claim 1, further comprising: measuring time of an ultrasonic signal which is transmitted to the detected object and returns, using an ultrasonic sensor; and detecting information on a distance between the object and a vehicle, based on the measured time.

6. A monitoring apparatus using a camera, comprising:
   an input unit which receives a photographed input image from the camera;
   an object detection unit which detects an object existing in the input image and positional information of the object using the center of the input image as reference;
   a distorted image correction unit which generates a corrected image from which information on the object existing in a distorted area is removed by correcting the distorted area of the input image; and
   a synthesized image output unit which generates a synthesized image by synthesizing alarm display information including information on the object existing in the distorted area which is generated on the basis of the object and the positional information, with the corrected image, and outputting the synthesized image through a display.

7. The monitoring apparatus according to claim 6, wherein the alarm display information includes at least one of an alarm image and an alarm text.

8. The monitoring apparatus according to claim 6, wherein the alarm display information is displayed an area, which corresponds to the positional information, in the corrected image.

9. The monitoring apparatus according to claim 6, wherein the object detection unit divides the input image into multiple areas which are set in advance, and searches for a pedestrian or an obstacle by detecting a peripheral area other than a central area, among the divided multiple areas.

10. The monitoring apparatus according to claim 6, wherein the object detection unit measures time of an ultrasonic signal which is transmitted to the detected object and returns, using an ultrasonic sensor, and detects information on a distance between the object and a vehicle, based on the measured time.

* * * * *